3,764,264
Patented Oct. 9, 1973

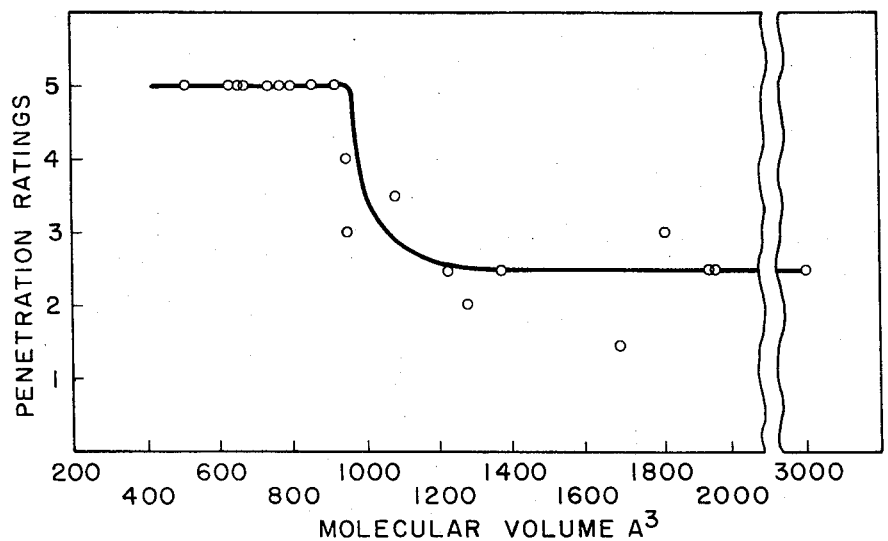
PENETRATION OF VARIOUS DYESTUFFS VS. MOLECULAR VOLUME MODIFIED POLYESTER AT 100°C. FOR 60 MIN.
INVENTORS
CLARENCE A. BOWERS
JAMES P. KIMBRELL
JAMES R. WILLIAMSON
BY
ATTORNEY _United States Patent Office_

3,764,264
PROCESS FOR DYEING POLYESTER FIBERS
WITH DISPERSE DYESTUFFS
Clarence A. Bowers, James P. Kimbrell, and James R. Williamson, Decatur, Ala., assignors to Monsanto Company, St. Louis, Mo.
Filed May 25, 1970, Ser. No. 39,967
Int. Cl. D06p 3/54
U.S. Cl. 8—179
3 Claims

ABSTRACT OF THE DISCLOSURE

Polyester fibers produced from dicarboxylic acids, or reactive derivative thereof, and a glycol, and modified with alkoxy poly(oxyalkylene) glycols may be dyed in a carrier-free disperse dyeing system by using disperse dyes of a molecular volume no greater than that determined by systematic measurement of penetration of dyes of various molecular volume.

BACKGROUND OF THE INVENTION

This invention relates to dyeing of polyesters produced by condensation reactions of polymethylene glycols and dicarboxylic acids or reactive derivatives thereof.

It is well known that some polymeric polyesters prepared by the condensation of a glycol or its functional derivatives and a dicarboxylic acid or a polyester-forming derivative thereof, such as an acid halide, a salt, or a simple ester of a dibasic acid and volatile monohydric alcohol are excellent fiber-forming polymers. Commercially, highly polymeric polyesters are prepared, for example, by the condensation of terephthalic acid or dimethyl terephthalate and a glycol containing from about 2 to 10 carbon atoms. These polyesters are relatively insoluble, chemically in active, hydrophobic materials capable of being formed into filaments which can be cold drawn to produce textile fibers of superior strength and pliability. Since these materials are not readily permeable to water, they cannot be satisfactorily dyed by ordinary dyeing procedures.

The compact structure of polyethylene terephthalate fibers, the molecules of which, are closely packed along the axis of the fibers, makes it quite difficult, except with a limited number of dyes, to obtain a high degree of dyebath exhaustion or to secure satisfactory deep shades. Absorption and penetration of the dye into the fiber core are limited by the inherent properties of the fiber. Dye assist agents or "carriers" are normally employed to swell polyester fibers in order to facilitate dye penetration.

A number of methods have been proposed to increase the dyeability of polyesters, and particularly polyethylene terephthalate; however, most have not proved to be entirely satisfactory. These methods have included the use of a number of additives to the polyester and various combinations of drawing and heat-treatment steps and procedures. Unfortunately, the use of most of these known procedures has resulted in thermally unstable polyesters, deterioration in fiber properties, nonuniformly dyed polymers, and the like.

Dramatic changes followed the use, as a polyester modifier, of small amounts of compounds having a typical general formula: R—O[G—O]$_x$—H, where R is an alkyl group containing an average of from about 8–20 carbon atoms; G is a hydrocarbon radical selected from the group consisting of ethylene, propylene and isomers thereof, butylene and isomers thereof, and mixtures of the above; and $x$ has an average value of from 8–20, and is about equal to or greater than R. These modified polyester compositions are prepared by reacting an aromatic dicarboxylic acid, the polymethylene glycol and a small amount of the glycol additive under polyesterification conditions under a fiber-forming polymeric polyester composition is obtained. Small amounts of a chain-breanching agent may also be added to the reaction as desired. These modified polyester compositions are useful in the production of shaped articles by extrusion, molding, or casting in the nature of yarns, fabrics, films, pellicles, bearings, ornaments, or the like. They are particularly useful in the production of thermally stable dyeable textile fibers having improved dyeability, particularly with disperse dyes.

SUMMARY OF THE INVENTION

It is an object of this invention to provide a process for dyeing the modified synthetic linear condensation polyesters described above;

It is another object of this invention to provide a process improvement whereby dye assist agents or "carriers" may be eliminated in the dyeing of polyester fibers. Briefly, the objects of this invention are accomplished by preparing fabric samples of modified polyester fibers prepared by extruding a fiber-forming polyester prepared from a dicarboxylic acid and a glycol and containing in the polymer a small amount of compounds having a typical general formula: R—O[G—O]$_x$—H, where R is an alkyl group containing an average of about 8–20 carbon atoms, G is a hydrocarbon radical selected from the group consisting of ethylene, propylene and isomers thereof, and mixtures of the above; and $x$ has an average value of 8–20 and about equal to or greater than R. Mixtures of these compounds may also be used. The additive may be used at concentrations of from about 0.25 mole percent to about 3 mole percent based on the moles of the dibasic acid or derivative employed (the upper limit being dictated primarily by processability considerations) with a preferred mole percent concentration of from about 0.75 using the higher molecular weight compounds, to about 2.0 when using the lower molecular weight compounds. Fabric samples are then dyed by conventional disperse dyeing methods (but without carrier or other rate increasing additives) using dyes of varying molecular volume. As the molecular volume of the dye is increased, there will be a sudden and dramatic drop in the penetration of the dye. The molecular volume of the dye just below the critical point where the penetration drops off is the maximum critical molecular volume of dye compatible with the molecular structure of this particular fiber. Dyes of a molecular volume no greater than the maximum critical molecular volume may then be used in a conventional carrier-free disperse dyeing system.

To further understand this invention reference will be made to the attached drawing that forms a part of the present application in which:

To further understand this invention reference will be made to the attached drawing that forms a part of the present application in which:

The figure is a graph showing penetration ratings of dyestuffs of varying molecular volume when used in a carrier-free disperse dyeing system with a typical modified polyester within the puriview of this invention.

DESCRIPTION OF THE PREFERRED EMBODIMENTS

The synthetic linear condensation polyesters contemplated in the practice of the invention are those formed from dicarboxylic acids and glycols, and copolyesters or modifications of these polyesters and copolyesters. In a highly polymerized condition, these polyesters and copolyesters can be formed into filaments and the like and subsequently oriented permanently by drawing. Among the polyesters and copolyesters specifically useful in the instant invention are those resulting from heating one or more of the glycols of the series $HO(CH_2)_nOH$, in which $n$ is an integer from 2 to 10, or cycloaliphatic glycols, with one or more dicarboxylic acids and ester-forming derivatives thereof useful in the present invention there may be named terephthalic acid, isophthalic acid, p,p'-dicarboxybiphenyl, p,p'-dicarboxydiphenyl sulfone, p,p-dicarboxydiphenylmethane, and the aliphatic, cycloaliphatic, and aryl esters and hal-esters, ammonium and amine salts, and the acid halides of the above-named compounds and the like. Examples of the polyhydric alcohols which may be employed in practicing the instant invention are ethylene glycol, trimethylene glycol, and tetramethylene glycol, cyclohexane dimethanol, and the like. Polyethylene terephthalate, however, is the preferred polymer because of the ready availability of terephthalalic acid or dimethyl terephthalate and ethylene glycol, from which it is made. It also has a relatively high melting point of about 250° C. through 265° C., and this property is particularly desirable in the manufacture of filaments in the textile industry.

The additives which are an essential part of this invention are compounds having a typical general formula: $R-O[G-O]_x-H$, where R is an alkyl group containing an average of from about 8–20 carbon atoms; G is a hydrocarbon radical selected from the group consisting of ethylene, propylene and isomers thereof, and mixtures of the above, and $x$ has an average value of 8–20, and about equal to or greater than R. By "average" is meant that the alkoxy glycol additive may comprise mixtures of the alkoxy glycol with some variances from the figures shown; but that the average of the integers in the mixture will be as indicated. Included within the meaning of "about equal," as used herein, is ±2. Preferably, the R group contains 12–16 carbon atoms. As the degree of polymerization ($x$) increases, so does the inherent capability of resisting and releasing oil-type stains in a fabric prepared from the ester. The additive may be used at concentrations of from about 0.25 to 3 mole percent based on the moles of the dibasic acid or derivative with a preferred mole percent concentration of from about 0.75 using the higher molecular weight compounds to about 2.0, using the lower molecular weight compounds.

As is well known in the textile finishing art, alcohols are converted to alkoxy glycols by reacting, to the hydroxyl group of the appropriate alcohol, the appropriate alkylene oxide to form an ether, as, for example:

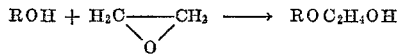

One mole of this ether is then further reacted with an additional alkylene oxide to produce the alkoxy poly(oxyalkylene) glycol (polyoxyalkylene ether) as follows:

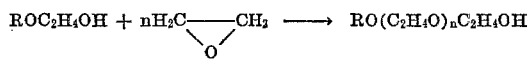

The preparation of the alcohols for use in this process is also well known in the chemical arts. Primary alcohols, for example, may be obtained from natural sources, as via the hydrogenolysis of fats or fatty acids or by the reduction of fatty acids with an alcohol or an alkaline metal. Hydrogenolysis is the reduction of a fatty acid, anhydride, ester of a fatty acid or metallic salt of a fatty acid to yield a fatty alcohol. The well known sodium reduction process is a typical example of the means by which the fatty esters may be reduced. The alcohols used may also be produced from synthetic sources as, for example, by the Oxo process which involves the addition of carbon monoxide and hydrogen to an olefin in the presence of a cobalt catalyst to produce an aldehyde. The next step consists of hydrogenation of the aldehyde.

The alkoxy poly(oxyalkylene) glycols can be prepared, for example by: (1) etherification by reaction of alkyl bromide and monosodium salts of polyalkylene glycol, commonly known as the Williamson synthesis:

$$RBr + NaO(CH_2CH_2O)_nH \longrightarrow RO(CH_2CH_2O)_nH + NaBr$$

(2) etherification by reaction of alkyl-p-toluene sulfonate and polyalkylene glycol:

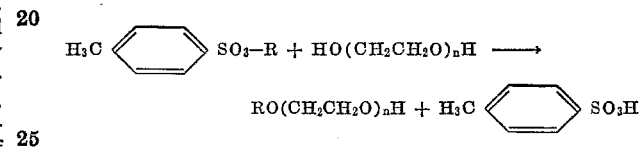

as well as by the above described etherification by reaction of alcohol and alkylene oxide, which is the most common of these reactions. The ethylene oxide condensation, may be carried out in the presence of an acidic or a basic catalyst, the latter being the most commonly used method for the manufacture of alkoxy poly(oxyethylene) glycols.

Any disperse dye may be subjected to the dye selection aspect of this invention; those of a molecular volume below the maximum critical molecular volume of the dye for the particular modified polyester employed can be used. Any conventional disperse dye method may be employed.

Molecular volume of a dye is determined by constructing Courtauld models; and the volume, expressed in terms of angstroms cubed ($A^3$) is estimated by treating the structure as a cylinder, and calculating a volume term using the formula $v = \pi r^2 h$, where $h$ is the length of the molecule and $r$ is the longest radius within the molecule as it rotates, $r$ and $h$ being measured under the Courtauld system.

Once the molecular volume of a series of disperse dyes ranging from a relatively small molecule to a relatively large molecule has been calculated, it is only necessary to dye, by conventional disperse dye methods, fabric samples prepared from the modified polyesters described above in order to determine the maximum critical molecular volume compatible with the molecular structure of the modified polyester.

In order to prepare polyester fibers suitable for the practice of the instant invention, the dibasic acid or ester-forming derivative thereof, the glycol, and the alkoxy polyalkylene glycol are charged to the reaction vessel at the beginning of the first stage of the esterification reaction, and the reaction proceeds as in any well-known esterification polymerization. If desired, a chain-branching agent may also be charged to the reaction vessel at this time.

When preparing the polyester from an ester, such as dimethyl terephthalate, the first stage of reaction may be carried out at 170° C. to 180° C., and at a pressure of 0 to 7 p.s.i.g. If the polyester is prepared from the acid, such as terephthalic acid, the first stage of reaction may be carried out at about 220° C. to 260° C. and at pressures of from atmospheric to about 60 p.s.i.g. The methanol or water evolved during the first stage of reaction is continuously removed by distillation. At the completion of the first stage, the excess glycol, if any, is distilled off prior to entering the second stage of the reaction.

In the second stage or polymerization stage, the reaction may be conducted at reduced pressures and preferably in the presence of an inert gas, such as nitrogen blanket over the reactants, the blanket containing less than 0.003 percent oxygen. For optimum results, a pressure within the range of less than 1 mm. up to 5 mm. of mercury is employed. This reduced pressure is necessary to remove the free ethylene glycol that is formed during this stage of the reaction, the ethylene glycol being volatilized under these conditions and removed from the system. The polymerization step is conducted at a temperature in the range of 220° C. to 300° C. This stage of the reaction may be effected either in the liquid melt or solid phase. In the liquid phase, particularly, reduced pressures must be employed in order to remove the free ethylene glycol which emerges from the polymer as a result of the condensation reaction.

Although this process may be conducted stepwise, it is particularly adaptable for use in the continuous production of polyesters. In the preparation of the described polyesters, the first stage of the reaction takes place in approximately ¾ to 2 hours. The use of an ester-interchange catalyst is desirable when starting with dimethyl terephthalate. In the absence of a catalyst, times up to 6 hours may be necessary in order to complete this phase of the reaction. In the polymerization stage, a reaction time of approximately 1 to 4 hours may be employed with a time of 1 to 3 hours being the optimum depending on catalyst concentration, temperature, viscosity desired, and the like.

The linear condensation polyesters, produced in accordance with this process, have specific viscosities in the order of about 0.25 to 0.6, which represent the fiber- and filament-forming polymers.

Specific viscosity, as employed herein, is represented by the formula:

$$\eta_{sp} = \frac{\text{Time of flow of the polymer solution in seconds}}{\text{Time of flow of the solvent in seconds}} - 1$$

Viscosity determinations of the polymer solutions and solvent are made by allowing said solutions and solvent to flow by force of gravity at about 25° C. through a capillary viscosity tube. In all determinations of the polymer solution viscosities, a solution containing 0.5 percent by weight of the polymer dissolved in a solvent mixture containing two parts by weight of phenol and one part by weight of 2,4,6-trichlorophenol, based on the total weight of the mixture is employed.

The polyesters described above may be produced to form filaments and films by melt-spinning methods and can be extruded or drawn in the molten stage to yield products that can be subsequently cold-drawn to the extent of several hundred percent of their original lengths, whereby molecularly oriented structures of high tenacity may be obtained. The condensation product can be cooled and comminuted followed by subsequent remelting and processing to form filaments, films, molded articles and the like.

Alternatively, the polyesters described above may be processed to shaped objects by the wet-spinning method, wherein the polyesters are dissolved in a suitable solvent and the resulting solution is extruded through a spinnerette into a bath composed of a liquid that will extract the solvent from the solution. As a result of this extraction, the polyester is coagulated into filamentary material. The coagulated material is withdrawn from the bath and is then generally subjected to a stretching operation in order to increase the tenacity and to induce molecular orientation therein. Other treating and processing steps may be given the oriented filaments.

If it is desired to produce shaped articles from the polyesters of the present invention which have a modified appearance or modified properties, various agents may be added to the polyester prior to the fabrication of the articles or those agents may be incorporated with the initial reactants. Such added agents might be plasticizers, antistatic agents, fire-retarding agents, stabilizers, and the like.

The following procedure was used to prepare the polymers in examples. The charge was added directly to a standard polyester autoclave and the system was purged six times with nitrogen, allowing the pressure to rise to 150 p.s.i.g., and then releasing it slowly to atmospheric pressure each time. Heat was then applied to the closed system, and when the temperature inside the autoclave had reached 100° C. to 125° C., the stirrer was started. When the temperature of the outside wall of the autoclave had reached about 250° C. (the inside temperature being about 230° C. to 235° C. and the pressure being about 25 p.s.i.g.), the off-vapor valve was adjusted to maintain these conditions of temperature and pressure. As the first distillate containing water and some ethylene glycol appeared, the esterification stage was considered to have started. The stirrer speed was set at 250 r.p.m. This esterification step usually took from about 40 to 60 minutes for completion, after which the pressure of the system was adjusted to atmospheric pressure. The heating rate was then increased until the temperature reached about 280° C. During this time, excess ethylene glycol was distilled off. An ethylene glycol slurry of titanium dioxide was introduced through an injection port then the inside temperature had reached 260° C. to 265° C. Then the inside temperature was raised to about 280° C., the pressure was maintained at less than 2 mm. Hg. and the polymerization continued until a polymer having a specific viscosity in the fiber-forming range between 0.30 to less than about 0.4 was formed. The polymer was extruded through a spinnerette, and the filaments obtained were drawn about 5 times their original length over a hot pin at about 80° C.

EXAMPLES

The autoclave was charged with 165 grams terephthalic acid, 330 mls. ethylene glycol, 0.04 gm. lithium acetate, 0.1 gm. antimony glycoloxide, 0.3 gm. pentaerythritol, and 8.0 gms. of the reaction product of 14 molar equivalents of ethylene oxide with an approximate equimolar molar mixture of straight chain alcohols having 14 to 15 carbon atoms. Polymer and fiber were prepared following the procedure described above. Dyeing was accomplished in a routine manner. Fabrics made from fibers produced by the above procedures were dyed for one hour at 100° C. at a liquor ratio of 30/1 using dyes whose molecular volume had been determined by the described procedure at a dye concentration of 1.5% based on fabric weight. Dye penetration was measured by viewing a cross-section of dyed fiber microscopically and rating the degree of penetration from 0–5, with 0 being a skin-dyed fiber and 5 a completely penetrated fiber.

For the particular modified polyester used in the examples, carrier-free disperse dyeing with dyes having a molecular volume of no greater than about 1,000 A.³ was found to produce excellent results.

TABLE I.—DYEING PROPERTIES OF DISPERSE DYES ON MODIFIED POLYESTERS

| | | Molecular volume A.$^3$ | Molecular weight | Dye penetration, 100° C. |
|---|---|---|---|---|
| 1 | Red 15 | 623 | 239 | 5 |
| 2 | Violet 1 | 655 | 238 | 5 |
| 3 | Blue 1 | 691 | 268 | 3–4 |
| 4 | Violet 17 | 754 | 318 | 5 |
| 5 | Orange 3 | 498 | 285 | 5 |
| 6 | Red 4 | 784 | 269 | 5 |
| 7 | Red 11 | 839 | 268 | 5 |
| 8 | Yellow 1 | 651 | 275 | 5 |
| 9 | Yellow 3 | 908 | 269 | 5 |

TABLE 1—Continued

| | | Molecular volume, A.³ | Molecular weight | Dye penetration, 100° C. |
|---|---|---|---|---|
| 10 | Yellow 23 | 731 | 302 | 5 |
| | ⌬—N:N—⌬—N:N—⌬—OH | | | |
| 11 | Red 59 | 941 | 305 | 4 |
| | anthraquinone with NH₂, OC₂H₄OCH₃, OH | | | |
| 12 | Blue 3 | 1,810 | 296 | 3 |
| | anthraquinone with NH·CH₃, NHC₂H₄OH | | | |
| 13 | Blue 120 | 1,696 | 355 | 1–2 |
| | anthraquinone with HO, OH, O₂N, NH—⌬ | | | |
| 14 | Red 13 | 940 | 349 | 3 |
| | O₂N—⌬(Cl)—N:N—⌬—N(C₂H₅)(C₂H₄OH) | | | |
| 15 | Blue 7 | 1,969 | 358 | 2–3 |
| | anthraquinone with HO, NHC₂H₄OH, NHC₂H₄OH, HO | | | |
| 16 | Blue 27 | 1,956 | 400 | 2 |
| | anthraquinone with HO, OH, O₂N, NH—⌬—C₂H₄OH | | | |
| 17 | Red 1 | 1,075 | 269 | 3–4 |
| | O₂N—⌬—N:N—⌬—N(C₂H₅)(C₂H₄OH) | | | |
| 18 | Red 7 | 1,219 | 365 | 2–3 |
| | O₂N—⌬—N:N—⌬(Cl)—N(C₂H₄OH)(C₂H₄OH) | | | |

TABLE 1—Continued

| | | Molecular volume, A.³ | Molecular weight | Dye penetration, 100° C. |
|---|---|---|---|---|
| 19 | Yellow 42 | 1,268 | 369 | 2 |
| 20 | Red 17 | 1,374 | 344 | 2-3 |
| 21 | Orange 13 | 3,003 | 352 | 2-3 |

We claim:

1. In the process of producing dyed synthetic fibers in which the fiber-forming substance is any long chain synthetic polyester composed of at least 85% by weight of an ester of a dihydric alcohol and terephthalic acid, wherein filaments are extruded from said polymer and subsequently orientation drawn, and disperse dyed, the improvement comprising (1) modifying said polymer by addition prior to formation of said polymer by polyesterification of from about 0.25–3 mole percent, based on the moles of the terephthalic acid, of mixtures of alkoxy poly(oxyalkylene) glycols having a typical general formula: $R-O[G-O]_x-H$, where R is an alkyl group containing an average about 8–20 carbon atoms, G is a hydrocarbon radical selected from the group consisting of ethylene, propylene and isomers thereof, and mixtures of the above, and $x$ has an average value of about 8–20, and about equal to or greater than R; and (2) dyeing said filaments by conventional high-temperature dyeing techniques to substantially complete penetration of said filaments in a carrier-free disperse dyeing system with a disperse dye having a molecular volume no greater than about 1,000 A³.

2. The improved dyeing method of claim 1 wherein the filaments are dyed in fabric form.

3. The improved dyeing method of claim 1 wherein R is an alkyl group containing an average of 14–15 carbon atoms, and $x$ has a value of 14.

References Cited

UNITED STATES PATENTS

| 3,122,410 | 2/1964 | Mueller | 8—41 |
| 2,828,180 | 3/1958 | Sertorio | 8—62 |
| 3,056,644 | 10/1962 | Badley et al. | 8—93 |
| 3,461,468 | 8/1969 | Morgan et al. | 260—75 T |

LEON D. ROSDOL, Primary Examiner

T. J. HERBERT, JR., Assistant Examiner

U.S. Cl. X.R.

8—169; 260—57 T